United States Patent [19]

King et al.

[11] 4,129,692

[45] Dec. 12, 1978

[54] ELECTRIC STORAGE BATTERIES

[75] Inventors: Walter J. King, Pinner; James C. Snook, Altrincham; Kenneth Peters, Manchester, all of England

[73] Assignee: Chloride Group Limited, London, England

[21] Appl. No.: 773,694

[22] Filed: Mar. 2, 1977

[30] Foreign Application Priority Data

Mar. 11, 1976 [GB] United Kingdom .................. 9876/76
Apr. 15, 1976 [GB] United Kingdom ............... 15665/76

[51] Int. Cl.$^2$ ............................................. H01M 4/72
[52] U.S. Cl. .................................... 429/234; 429/241; 429/245
[58] Field of Search ............................. 429/234–237, 429/233, 241–244, 246, 245, 225–228

[56] References Cited

U.S. PATENT DOCUMENTS

| | | | |
|---|---|---|---|
| 3,033,909 | 5/1962 | Urry | 429/235 X |
| 3,808,040 | 4/1974 | Barnes | 429/234 X |
| 3,944,432 | 3/1976 | Brinkmann | 429/234 |
| 3,956,012 | 5/1976 | Schalle | 429/234 |
| 3,973,991 | 8/1976 | Cestaro et al. | 429/237 X |

Primary Examiner—Charles F. Lefevour
Attorney, Agent, or Firm—Oblon, Fisher, Spivak, McClelland & Maier

[57] ABSTRACT

There is disclosed an electrode structure for an electrochemical cell comprising a fibrous support made of organic polymeric material, which is 0.1 to 3 mm. thick, carrying a pattern of solid conductors extending over the surface of the porous support from a current take off region to regions spaced therefrom, and containing electrochemically active material deposited on the fibrous support, in contact with the conductors, in an amount of at least 0.1 grams/sq. cm/mm thickness in such a manner that electrical energy produced by the electrochemical reaction can be conducted out of the electrode. Also disclosed are methods and apparatus for making the structure.

13 Claims, 14 Drawing Figures

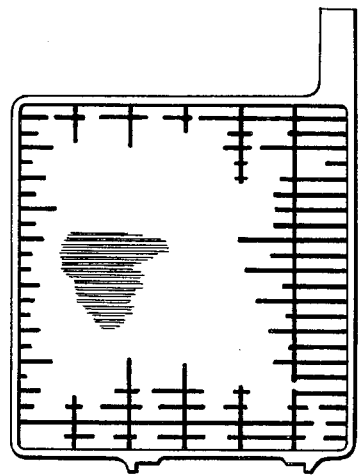 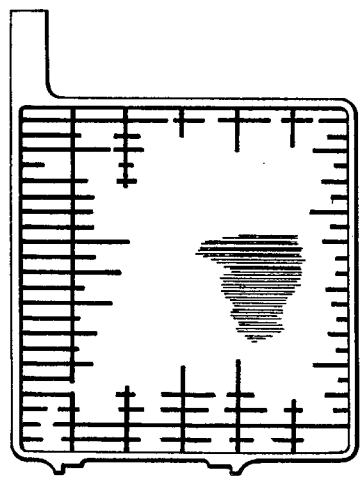
FIG.11.    FIG.12.
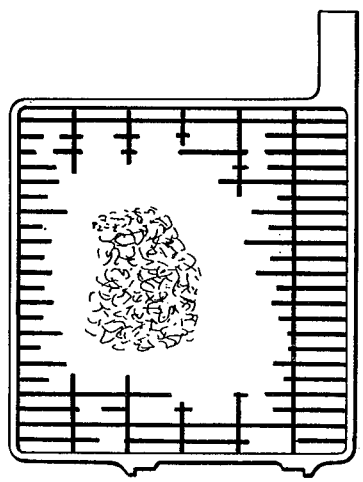 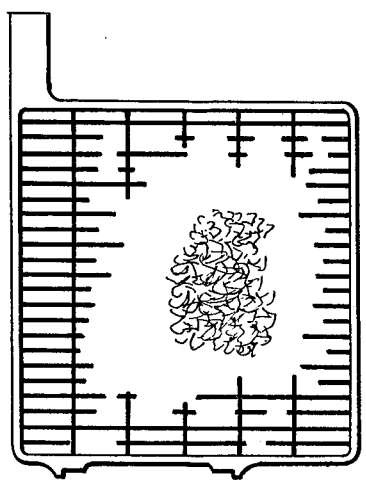
FIG.13.    FIG.14.

ELECTRIC STORAGE BATTERIES

The present invention relates to electrochemical cells e.g. lead acid cells, and batteries made up from such cells.

Cells and batteries in accordance with the present invention are characterised by the presence of any one or more of the features enumerated below taken in any combination.

According to one aspect of the present invention an electrode structure of an electrochemical cell comprises a fibrous support material, which is desirably 0.1 to 3 mm. thick, containing metal or metal compound deposited in such a manner as to impart electrical conductivity to the electrode structure, and containing electrochemically active material deposited on the fibrous support and desirably within the interstices of the fibrous support, desirably in an amount of at least 0.1, e.g. 0.2 to 1.0 or 0.3 to 0.5 grams/sq. cm/mm thickness in such a manner that electrical energy produced by the electrochemical reaction can be conducted out of the electrode.

The polymers used for the fibrous support must be satisfactorily resistant to the conditions which will be encountered, e.g. for a lead acid cell, 1.280 S.G. sulphuric acid at 80° C. and the oxidative activity of lead oxide. We thus prefer to use polyethylene, polypropylene, polyesters such as polyethylene terephthalate, polyvinyl chloride, polyvinylidene chloride, vinyl acetate/vinyl chloride copolymers, acrylics such as polyacrylonitrile, polytetrafluoroethylene, and regenerated cellulose. Polyesters are preferred. Electrical conductivity is preferably imparted to the electrode structure by a pattern of solid massive linear conductors extending over the surface of the porous support from a current take off region to regions spaced therefrom.

The massive linear conductors have a continuous solid structure preferably having a cross sectional area of at least 0.03 sq. mm, i.e. a diameter of about 0.2 mms, up to 7 sq. mm. i.e. a diameter of 3.0 mm. However cross sectional areas in the range 1.75 sq. mms (1.5 mms diameter) to 0.2 sq. mms (0.5 mms diameter) are preferred. These conductors can be straight or curved and may extend radially from the current take off region or preferably rectilinearly therefrom e.g. in a lattice or grid pattern. This lattice or grid pattern need not extend over the whole area of the electrode structure and indeed it is preferred that it should extend over less than the whole area e.g. in the range 15% to 85% or 25% to 75% of the whole area. An edge conductor member may extend around the whole area of the electrode structure from the current take off region. Structures with this feature here the advantage of imparting stiffness to the structure by a type of stressed skin effect which permits the conductors to be omitted from a substantial area of the inner region of the electrode structure.

The edge conductor is typically 0.5 to 3.0 mms wide and 0.2 or 0.5 to 1.0 or 1.5 mms thick, e.g. it may have a cross section area in the range 0.10 to 4.5 sq. mms. In general it will tend to have a greater cross sectional area than the remainder of the conductors. The portion of the edge conductor, or the portions of the edge conductor extending along the two edges adjacent to the current take off region, may be of greater cross sectional area than the portions remote therefrom indeed one or both of such remote regions of the edge conductor may be dispensed with.

One satisfactory electrode structure is rectangular in plan and has a current take off region in the form of a lug in one corner; an edge current conductor extends right round the edge of the support which is a thin dense but porous sheet of polyester fibres welded in lines about 1 mm wide spaced apart by about 1 mm, and having a rectilinear grid pattern of wires of smaller cross section than the edge conductor and consisting of horizontal wires spaced 5 to 10 mms apart and vertical wires spaced about 2 to 4 cms apart.

The rectilinear conductors extend inwardly from the edge conductors so as to leave a central conductor free region. The vertical wires extend for about 40 to 60% of their possible theoretical length and the horizontal wires for about 30 to 50% of their possible theoretical length from edge to edge of the plate.

In another embodiment the electrode support is in the form of an endless strip or strip of extended length, namely a length at least 10 times its width, and the material has a regular pattern of conductors formed on its surface preferably in a rectilinear pattern, the ratio of the plan area of the conductor to plan area of the electrode structure being about 1:5 or preferably in the range 1:5 to 1:8 or 1:11 or 1:15.

The invention also extends to a method of making an electrode structure which comprises forming solid metal conductors extending over at least part of the surface and extending from a current take off region and depositing electrochemically active material on the porous support in contact with the metal conductors whereby electrical energy produced by electrochemical reaction in the active material is conducted to the current take off region.

The solid metal conductors may be made by depositing molten metal on the fabric and applying cooling to the molten metal on the fabric as soon as it is deposited so as to prevent the porous fabric's integrity being destroyed. One preferred way of depositing the solid metal conductors on the fabric is to locate the fabric in a relatively massive die cavity held at a temperature below the melting point of the metal used to form the solid conductors, and below the melting point of the polymer of the fabric, the fabric remaining in the mould for the minimum time possible and injecting or pouring the molten metal into the mould so that it flows around the fabric and bonds thereto and then removing the composite from the mould.

In an alternative preferred method the solid conductors are formed continuously by leading the fibrous support past a ported member to the interior of which the molten metal is supplied with the support being held at a temperature below the melting point of the metal which is being applied to the porous support, and the molten metal issuing through the ports in the member.

The member may be a cylinder and may rotate with the surface of the porous support. The ports may extend circumferentially of the cylinder when they may be arranged to lay down continuous solid conductors along the length of the fibrous support or may extend parallel to the longitudinal axis of the cylinder when they will lay down transverse solid conductors.

In a preferred arrangement the ported member comprises a fixed inner cylinder having an inlet chamber to which the molten metal is supplied, e.g. from one end, and a downwardly extending supply slot or slots or passage.

An outer annular member is mounted for close fitting rotation around the outside of the fixed cylinder and is provided with ports passing through it so that it can act as a sleeve valve for the supply slot of the inner cylinder. Thus the molten metal can only issue from the device when the ports in the outer annular member are in register with the supply slot in the inner cylinder.

Cooling means, e.g. an air blast, may be directed at the surface of the outer member or at the surface of the fibrous support as it emerges from beneath the ported cylinder or at both locations.

If desired the porous fibrous support can be provided with an overall metallizing coating so that whilst it remains porous the individual fibres of the support are metallized so that the conductivity of the structure is further enhanced. Thus metallizing can be done before the linear solid conductors are formed or after they have been formed.

The fibrous support may be woven fabric, an unbonded non-woven fabric e.g. a needle punched fabric or a bonded non-woven fabric.

In a preferred aspect of the invention we utilize a non-woven fibrous support, fibres of which are fused to other fibres, substantially all of the fibres being fused to at least one other fibre. One specific form of such a fabric is a melded fabric in which the fabric contains at least a proportion of bicomponent or heterofil fibres. These are fibres having an inner high melting core and an outer lower melting sheath.

The initial non woven fabric is preferably made of short staple fibres which are carded to form a web and a number of webs are crosslayed or overlapped to form a felt. This felt is optionally entangled e.g. needle punched and is then melded.

Preferred materials are melded polyester fabrics and spun bonded and adhesive bonded modacrylic fabrics e.g. those sold as TEKLAN.

The active material preferably has a particle size of less than 150 microns and the structure of the fabric is preferably such as to act as a filter for the said active material which is desirably applied to the fabric as an aqueous composition e.g. from 50 grams active material in 10 mls water, desirably from 50 grams to 50 mls to 50 in 150 mls e.g. about 50 grams in 100 mls, up to 50 grams in 1000 mls and above, the maximum dilution being determined by the conflicting requirements of evenness of distribution over the fabric and rapidity of filtering. In the application of the invention to lead acid cells the active materials will be lead oxide active materials. These may be sulphated e.g. containing 5 to 50% of sulphate ions, or higher degrees of sulphation if desired, e.g. in the range 30 to 85% sulphation or even up to 100% sulphation.

The fibrous support material before impregnation preferably has an air permeability (as defined herein) of 0.5 to 40 and preferably 5 to 30 liters/sq. cm./minute.

The fibrous support material and the separator are preferably to have a good moisture retention, a good rate of wicking, i.e. they pick up and permit liquids to wick rapidly through them by capillary action and good gas (especially $O_2$) permeability so as to retain electrolyte within their pores readily and especially in the case of the separator also to permit rapid passage of gas through it even when containing electrolyte.

The fibrous material, which will be referred to merely as the separator, preferably has a void volume in excess of 40%, e.g., at least 50% or 60% or 70 or 80 or 95%. Non-woven fibrous mats may be used as separators especially glass fibre mats preferably having a thickness in the range 50% to 150% of the thickness of the positive or negative plate, e.g., in the range 0.5 to 3.0 mm. or more broadly 10% to 200%.

The separator is preferably relatively porous and is compressed in certain regions, preferably as parallel channels, so as to reduce its gas permeability but increase its moisture absorption and wicking rate.

The fibrous support and optionally also the separator material preferably comprises a non-woven fibrous material, which is preferably melded. The material is preferably 0.1 to 1 mm. thick and has a permeability to air of 0.001 to 0.1 e.g. 0.01 to 0.02 liters per second per cm head of water per square cm, and a tensile strength of at least 0.01 e.g. 0.1 to 1.0 Kgs per sq. mm.

The material preferably has compressed porous regions have a thickness D which is related to the thickness C of the remainder of the material in the range of ratios 1:10 to 1:2. The area of the separator occupied by such compressed regions is preferably 10% to 50% of the total plan area of the separator. The compressed regions are preferably provided as strips of equal width spaced equal distances apart and preferably arranged to extend up and down in the cell as assembled. If desired transverse compressed strips can also be provided. The bonding of the fibres to each other may be localized in these strips.

The material typically weighs 100 to 250 grams/sq. meter e.g. 160 to 200 grams per sq. meter and is 0.5 to 0.8 mms thick.

The present invention may be put into practice in various ways and a number of specific embodiments will be described by way of example with reference to the accompanying drawings, in which:

FIGS. 11 and 12 are planned views of either side of a composite plate similar to that shown in FIG. 2 and in accordance with the present invention.

FIGS. 13 and 14 are planned views of either side of another composite plate similar to that shown in FIG. 2 and in accordance with the present invention.

The preferred porous support material used for making the plates described below in Examples 1, 2 and 3 is shown in much enlarged cross section in FIG. 1. It will be referred to as Felt A. It is made from polyester heterofil or bicomponent fibre by laying down as a non-woven bed of fibres e.g. as a air or water leaf or a carded web overlapped or cross laid to form a felt, followed by heating and possibly also pressure to a temperature such that the fibres fuse at their points of contact. The fibres are typically 25 to 150 mms, e.g. 80 to 100 or about 90 mms long and have a fused point of contact with another fibre every 1 to 10 e.g. 3 to 8 or about every 5 mm length of fibre. The diameters of the fibres are typically in the range 5 to 50 e.g. 10 to 20 or about 17 microns.

The melting point for the sheath portion of the fibres of felt A was 220° C. and for the core was 250° C.

The material has a porosity of 70 to 75% (as measured by comparison of true density determined by Helium absorption and apparent density determined by mercury absorption) and an air permeability when dry of $1.67 \times 10^{-2}$ liters per sec. per cm head of water per square cm i.e. 1.0 liters/minute/sq. cm. Felt A has a liquid water permeability of 180 ccs/minute/sq. cm. at a water head of 50 cms.

Figure 1:
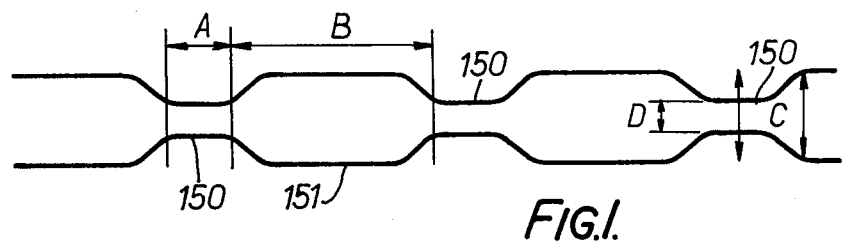
FIG. 1 is a diagrammatic cross section on an enlarged scale of a preferred fibrous support material.
Figure 2:
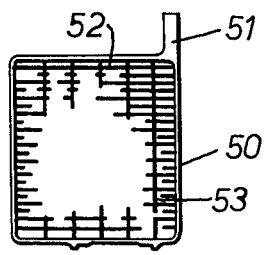
FIG. 2 is an electrostatic copy of a POLAROID photograph in plan view of a composite electrode support structure in accordance with the present invention.

The material as can be seen in FIG. 1 is provided with channels 150 which are provided by regions which have been subjected to increased heat and pressure and which whilst still porous are more dense than the remaining regions 151.

The compressed regions 150 provide for a much enhanced rate of liquid transport whilst the uncompressed regions 151 facilitate gas transport through the material. Referring to FIG. 1, A is the width of the region 150, B the width of the region 151, C is the thickness of the region 151 and D is the thickness of the region 150. In felt A, A is 0.5 mms, B is 1.2 mms, D is 0.1 mms, and C is 0.6 mms. More broadly the ratio of B to A is preferably at least 1, 2 or 3 and preferably in the range 4:1 to 10:1 e.g. 5:1 to 7:1. A is preferably 0.5 to 2 mms. The thickness of the region 150, namely D, is preferably 0.05 to 0.5 mms whilst the thickness of the region 151, namely C, is preferably 0.3 to 2 mms, e.g. 0.5 to 1.0 mms and D is about 0.1 mms and B/A is 3 to 5.

The material has a high rate of wicking up the compressed channels 150 which are preferably disposed vertically in the cell i.e. parallel to the longitudinal axis. Thus when the bottom edge of the material is immersed in 1.280 sp. gravity sulphuric acid at 20° C. in an ambient atmosphere, the electrolyte rises 4 cms up the channels 150 in 15 seconds and 10 cms in 2 minutes. The acid permeates out sideways from the channels 150 into the regions 151 more slowly.

EXAMPLE 1

A piece of felt A 12 cms by 12 cms was located in a conventional gravity casting mould for making lead grids with its edges clamped by the mould on three sides. The mould was heated to 190° C., the mould face had been sprayed with a conventional thermal insulation layer of cork composition to a thickness of about 0.005 inches. The melded fabric was found to start melting if the mould temperature was above 200° C.

A molten 6% antimony lead alloy held at 500° C. was poured into the mould from the lug corner in an amount insufficient to fill the mould. The mould was then opened and the composite structure removed and trimmed to shape. The finished grid was 11.5 cms by 11.5 cms. As can be seen it has a full edge conductor 50 extending right round the plate from the lug 51. The plate also has twenty two horizontal conductors 52 and five vertical conductors 53. (The terms horizontal and vertical are used in relation to the lug which normally points upwards). As can be seen the conductors unlike in a conventional cast lead grid do not extend from side to side of the plate. Indeed the horizontal conductors only extend about 38% of their total theoretical length (i.e. 22 × the distance from side to side of the plate) and the vertical conductors only extend about 45% of their total theoretical length (i.e. 5 × the distance from top to bottom of the plate).

Figure 3:
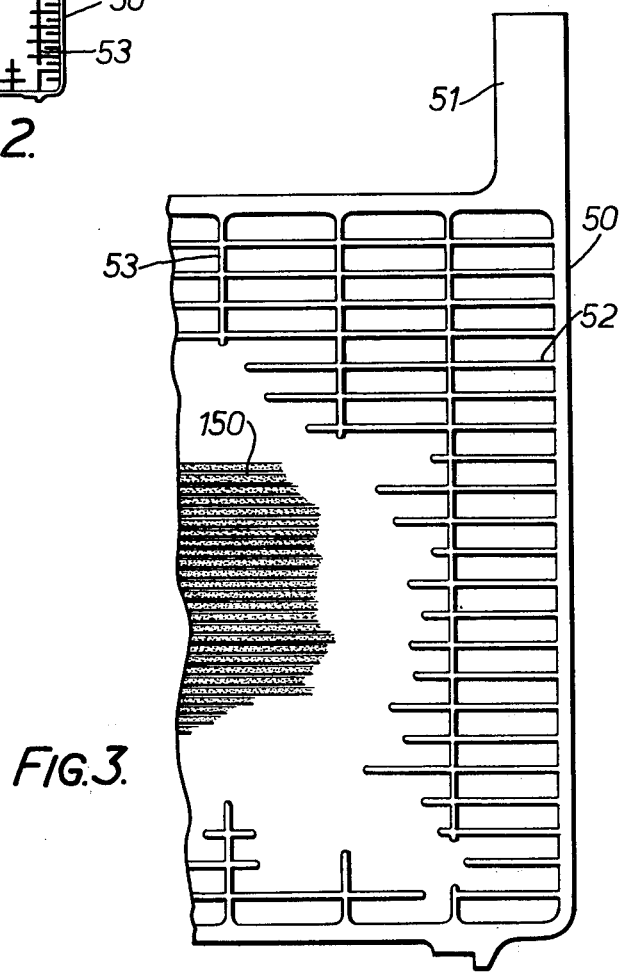
FIG. 3 is a close-up view in transmitted light of the structure of FIG. 2 showing the location and disposition of the meld lines in the fibrous support.
Figure 4:
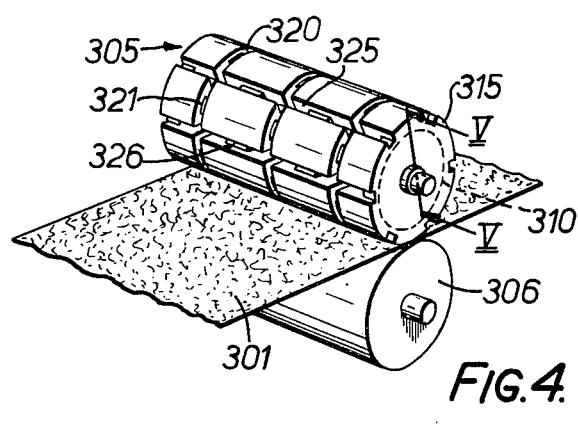
FIG. 4 is a diagrammatic perspective view of a ported cylinder printing device for depositing molten lead on the fibrous support in accordance with the present invention.
Figure 5:
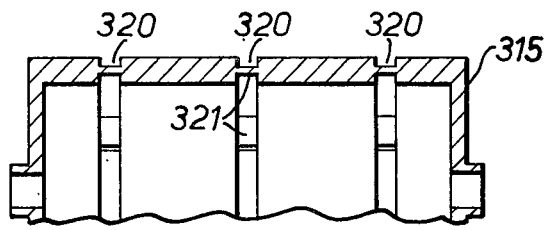
FIG. 5 is a vertical cross section of the upper half of the outer member of the device shown in FIGS. 4 along the line XVI — XVI

As can be seen in FIG. 3 the porous support has not been fused by the conditions in the mould and the meld lines or compressed channels 150 which show up as lighter strips in FIG. 3 can still be readily observed.

The material, despite usisng significantly less lead than a conventional cast grid has excellent stiffness.

EXAMPLE 2

Example 1 was repeated using a melt temperature of 400° C. and a mould temperature of 190° C. In this example the horizontal conductors extend 48% of their total theoretical length and the vertical conductors extend 55% of their total theoretical length. Again the structure has excellent stiffness.

EXAMPLE 3

Example 2 was repeated using a melt temperature of 500° C. and mould temperature of 170° C.

Here the horizontal conductors extend 30% of their total theoretical length and the vertical conductors extend 42% of their total theoretical length. Again the structure has excellent stiffness.

EXAMPLE 4

A plate made as described for Example 1 as placed in a filter funnel and a lead oxide slurry filtered through it, under a water pump vacuum of about ½ asmosphere pressure difference, from one side.

The slurry was of 150 grams of Hardinge Oxide (65% lead oxide 35% lead) in 100 mls of water. The slurry has a particle size distribution of:

100% less than 150 microns
93% less than 54 microns
68% less than 30 microns
31% less than 14 microns
13% less than 8 microns i.e.

7% by weight was between 54 and 150 microns
25% by weight was between 30 and 54 microns
37% by weight was between 14 and 30 microns
18% by weight was between 8 and 14 microns Thus 62% was between 14 and 54 microns and 80% was between 8 and 54 microns.

The fabric picked up a layer of active material about 0.5 to 1.0 mm thick on one face, 33 grams dry weight.

The layer of active material was then sprayed with sulphuric acid (1.1 specifice gravity) on both faces and dried.

It was then electrolytically formed in conventional manner, namely in 1.050 sp. gr. sulphuric acid for 144 hours at 20° C. and a current density of 2m amps/sq. cm.

EXAMPLE 5

This describes the production of a negative battery plate from Felt A as in Example 4.

The active material used has the following composition:

| | |
|---|---|
| Leady oxide | 1091 Kgs |
| Vanisperse CB lignosulphonate | 3.21 Kgs |
| Barium sulphate | 5.5 Kgs |
| Fibre | 0.23 Kgs |
| Antioxidant (Stearic acid) | 0.57 Kgs |
| Carbon black | 1.8 Kgs |
| Water | 120 Liters |
| Sulphuric acid (1.4 SG) | 60 Liters |

The solids were first mixed dry and then the water was added and thoroughly blended and then the acid.

The Vanisperse CB content based on active material is 0.3%; Vanisperse CB has a lignosulphonate content of about 80%.

1 Kg of this paste was diluted with 1.5 liters of water to form a slurry.

A plate produced as in Example 1 had the above slurry filtered through it from one side so that the material had picked up a layer of active material about 0.5 to 10. mm thick on its face.

The plate was then electrolytically formed in conventional manner.

EXAMPLE 6

In a further alternative the mould is modified so that one face of the mould is blank and solid conductors are only formed on one face of the porous sheet. The casting conditions used are as in Example 1. This structure can now be coated with active material on the surface which carries the solid conductor the other surface being left free and non conducting to act as a separator.

Alternate sheets may thus be coated with positive active material and with negative active material, the lugs of the sheets being offset from each other and a cell assembled without the need to use additional separator material. Such a structure can also be used in a wound cell with advantage one strip having negative active material deposited on it and the other strip having positive active material deposited on it, the non conducting backs of the strips acting as separators.

EXAMPLE 7

FIGS. 11 and 12 are electrostatic photocopies of either side of a composite plate made in the same manner as Example 1 using the same melded fabric with the meld lines 150 disposed parallel to the lug. A 6% antimony lead alloy was poured at 520° C. into the mould containing the fabric, the mould being held at 170° C. and the mould being orientated as described for Example 1. The metal was poured into the mould at the top side i.e. along the edges vertically below the lugs.

The lead conductors 52 and 53 adhered strongly to the fabric. This was measured in the following test. The grid was held flat by means of a template providing an opening above the selected wire, the end of the wire was sliced from the felt for a distance of 5 mms, a wire was attached to this freed portion of the cast on wire and lead around a pulley located 50 cms directly above the selected cast on wire. A load was applied which increased at a rate of 20 grams/minute from zero load until the wire was ripped away from the fabric.

Loads at failure of 260, 300 and 280 grams were recorded for three different wires for a plate made in the manner shown in this example.

EXAMPLE 8

FIGS. 13 and 14 are electrostatic photocopies of either side of a composite plate made in the same manner as Example 7 but using a much more porous and thinner non-woven needle-punched polyester fabric, which will be referred to as felt F.

Felt F is made of non-woven polyethylene terephthalate fibre. This is made as follows:

A thin web (1.5 meters wide) of fibres having an average length of 4½ inches is produced by carding, and a fleece is produced by layering approximately ten webs to form a continuous length of non-woven fabric (also 1.5 meters wide).

The fibres extend generally longitudinally in the web, which is pleated in a zig-zag fashion as it is taken off from a conveyor travelling in the direction of the length of the web onto a conveyor travelling at right angles thereto. Thus the fibres extend substantially transversely to the length of the fleece, but due to the travel of the second conveyor the fibres in adjacent layers are oppositely inclined at a small angle to the transverse direction.

It has a thickness of 0.5 to 0.7 mm and weighs 80 to 110 grams/sq. cm. It has an air permeability of 5–15, e.g. 6.4 liters/min/sq. cm./cm head of water and a water permeability of 270 cc/min/sq. cm area at a head of water of 50 cms.

This non-woven fabric is made up of randomly entangled individual fibres. The fibres have a diameter of about 25 microns or more broadly 20 to 50 microns. The gaps between individual fibres are in general less than 250 microns and mostly less than 100 microns and moreover the material in having a thickness of 0.5 to 0.7 mms has a three dimensional structure permitting the overlap of many individual fibres in any one path from face to face of the sheet.

Air permeability was measured as follows:

A sample 2.8 cm in diameter (6.16 sq cm effective cross-sectional area) was clamped in position and the time for 50 l. of dry nitrogen to flow through the sample at 20° C. under a pressure difference of 0.6 inches (1.5 cms) water gauge was recorded.

Water permeability was measured on the same sample by measuring the time taken for a column of water initially 42 cm high and 1 liter in volume to flow under gravity through the sample.

The downstream end of the column below the sample was blocked off, the water introduced above the sample and then the downstream end below the sample opened to atmosphere.

The adhesion between the wires 52 and 53 and the fabric was tested as described for Example 7 and loads at failure of 140, 180 and 160 grams were recorded for three different wires for a plate made in the manner shown in this example.

The resistance of the electrode structures made in accordance with Examples 7 and 8 to bending was compared with cast grids made under the same casting conditions and using the same mould. These three grids were clamped along a line 7.5 cms from their bottom bars and wires were attached to each corner and connected to a single wire and lead over a pulley 50 cms above the grid and an increasing load applied. The upwards deflection of the bottom bar was measured as the load was increased by 20 grams each minute. The deflection of the grids was the same up to a load of 200 grams namely about 1 cm. Thereafter the composite fabric grids deflected upwardly more rapidly than the cast grids.

However, the grids made with the ribbed fabric snapped adjacent the clamping point at a load of 300 grams after a time of 29 minutes. The grids made with the non-woven fabric finally bent vertically at a load of 500 grams which had been applied after 68 minutes, the bending to a vertical position only occurring after this load had been applied for a further 23 minutes. The cast grid at this stage had deflected upwardly by 4 cms.

The resistence to bending of felt A, the melded fabric, and felt F, the needle-punched non-woven felt was measured in the same way as described above.

A load of 5 grams caused Felt A to deflect upwards by 32 mm, and felt F by 27 mm.

EXAMPLES 10-17

Composite electrodes made as described in Example 7 or Example 8 were placed in a Buckner funnel and the area around the grid masked off. Slurry compositions as specified in Table 1 below were then filtered through the electrodes from one side only using water pump suction. The dry weight of active material picked up by the plates is also given in Table 1, the area of a fabric within the edge runners for each plate was 126.5 sq. cms.

20° C., more especially in the range 0.01 to 2.0 lbs ft. Particularly preferred ranges are 0.025 to 1.75 especially 0.1 to 0.5.

The degree of sulphation referred to applies to the lead oxide component of the active material.

Examples of slurries having these characteristics are given in table 2 below, all of which used Hardinge oxide as described above.

TABLE 2

| Slurry number | Ratio of solids to liquids | % sulphation | Torque value lbs ft at 20° C. at 6 r.p.m. |
|---|---|---|---|
| S.1 | 2 : 1 | 60 | 0.34 |
| S.2 | 2 : 1 | 100 | 0.11 |
| S.3 | 1.5 : 1 | 60 | 0.12 |
| S.4 | 1.5 : 1 | 100 | 0.03 |
| S.5 | 1 : 1 | 60 | 0.05 |
| S.6 | 1 : 1 | 100 | 0.02 |
| S.7 | 3 : 1 | 20 | 0.59 |
| S.8 | 3 : 1 | 40 | 0.99 |
| S.9 | 3 : 1 | 60 | 1.71 |
| S.10 | 3 : 1 | 80 | 0.13 |
| S.11 | 3 : 1 | 100 | 0.14 |

The background torque value was 0.004 lbs ft.

The invention has been described so far with reference to a batch process. However some of the greatest advantages of the process stem from its ability to be carried out as a continuous production process. In such a process a continuous (in the sense of a very long length) of porous fibrous support is first lead past solid conductor applying means, (an example of one such

TABLE I

| Ex. | Grid used Example | Hardinge Oxide (gms) | Water (mls) | 1.4 Sp. gr. Sulphation Acid (mls) | Sulphation % | Filtrate Vol (mls) | Wet Paste Weight (gms) | Dry Paste Weight (gms) | Ease of Filtration |
|---|---|---|---|---|---|---|---|---|---|
| 10 | 8 | 200 | 133 | 0 | 0 | 112 | 147.5 | 119 | 8 |
| 11 | 7 | 200 | 133 | 0 | 0 | 85 | 137 | 122 | 7 |
| 12 | 8 | 200 | 133 | 121.25 | 15% | 52 | 96 | 70 | 4 |
| 13 | 7 | 200 | 133 | 12.25 | 15% | 54.5 | 131 | 76.5 | 3 |
| 14 | 8 | 200 | 133 | 41.0 | 50% | 95 | 227 | 167 | 2 |
| 15 | 7 | 200 | 133 | 41.0 | 50% | 83.5 | 189 | 150 | 1 |
| 16 | 8 | 200 | 133 | 66.0 | 85% | 87 | 58 | 43 | 6 |
| 17 | 7 | 200 | 133 | 66.0 | 85% | 60.5 | 65.5 | 53.5 | 5 |

Examples 10, 12, 14 and 16 used the more porous fabric, felt F.

The figures under ease of filtration in Table 1 are merely a ranking of the examples. It can be seen that the examples using Felt F all filtered more readily than the Examples 11, 13, 15 and 17 which used the more dense fabric, felt A.

Examples 10 and 11 using non-sulphated paste filtered most easily and achieved good dry weight pick ups.

However, in order to reduce the length of time needed in the subsequent pickling stage, we prefer to at least partially sulphate the oxide before it is applied to the plates. We prefer to use oxide slurries having a degree of sulphation in the range 15% to 80% especially 15% to 50%. These we find produce plates with higher porosities than are produced at either 0% sulphation or 85% sulphation.

Thus more broadly we prefer to use fabric supports having an air permeability of at least 1 and preferably 2 liters/minute/sq. cm. per cm. head of water and more preferably at least 5, especially in the range 5 to 40 or 10 to 30. In addition, we prefer to apply the active material as a pourable slurry capable of being filtered under suction through the porous fabric. More specifically we prefer to use a slurry having a rotating vane viscometer torque value (as herein defined) of at least 0.006 lbs ft. at means is shown in FIGS. 4 to 9) which applies the desired pattern of longitudinal and transverse or other conductors and desirably also an edge solid conductor affording current take off regions. This edge conductor could provide lugs or ears directly or could be a continuous strip out of which lugs or ears could be formed by a subsequent continuous cutting or punching operation. Alternatively lugs or ears could be welded or cast onto the edge conductor strip.

The strip carrying the solid conductor is then lead continuously past active material applying means which lay down a layer of active material on and possibly also within the interstices of the porous support depending on the particle size of the active material and the separation of the fibres in the support.

Figure 10:
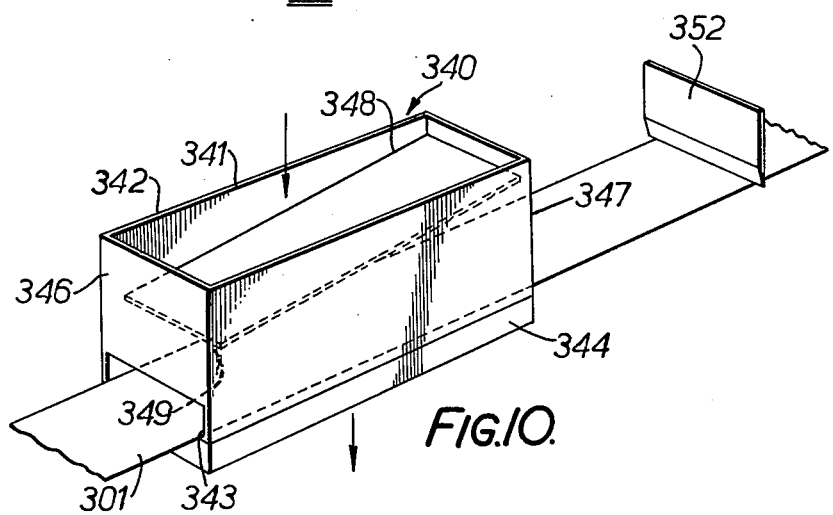
FIG. 10 is a diagrammatic perspective view of a slurry supply system for depositing slurry continuously on the electrode support structure.

The active material applying means may be a conventional automatic pasting machine. Alternatively and preferably the active material may be applied as a pumpable slurry since this facilitates handling of the active material. Preferably the slurry is then drawn onto the porous support by applying a pressure difference across the porous support e.g. by applying suction to the face of the porous support remote from that in contact with the slurry. An example of one form of apparatus for doing this is shown in FIG. 10.

Figure 6:
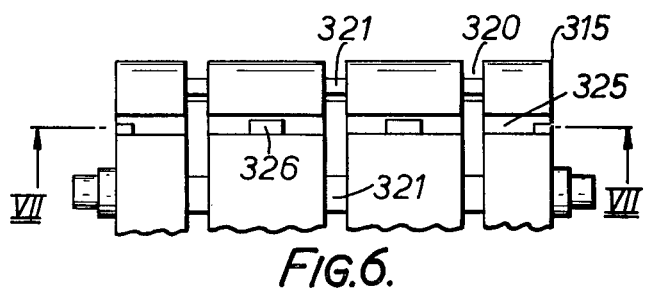
FIG. 6 is a plan view of part of the upper half of the outer member shown in FIG. 4.
Figure 7:
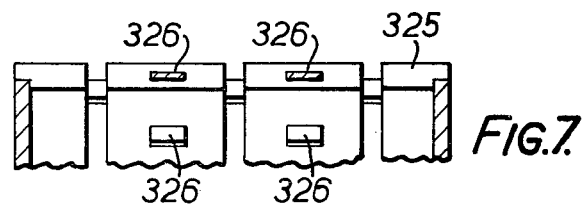
FIG. 7 is a view similar to FIG. 5 but along one of the longitudinal slots.
Figure 8:
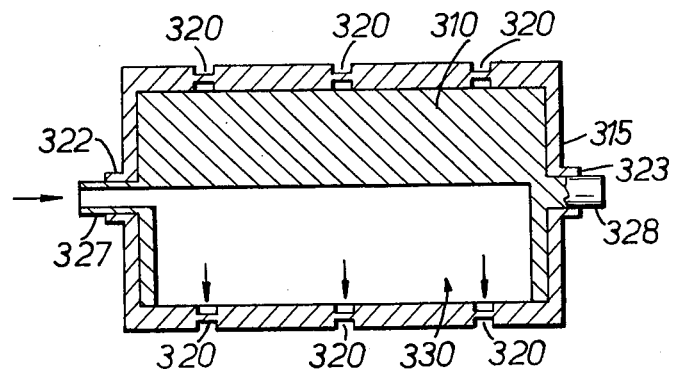
FIG. 8 is a vertical cross section of the device shown in FIG. 4 through its longitudinal axis.
Figure 9:
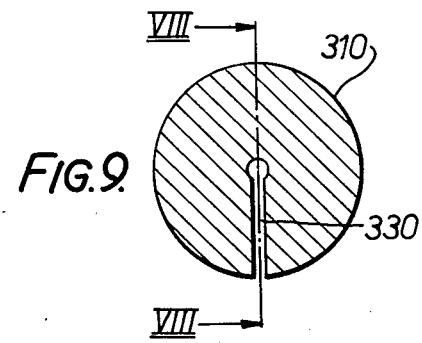
FIG. 9 is a transverse cross section through the inner cylinder of the device shown in FIG. 4

Referring now in detail to FIGS. 4 to 9 FIG. 4 shows the porous support 301 being lead through a nip formed between a solid conductor applying device 305 and a back up roll 306. The device 305 consists of a fixed inner cylinder 310 and a close fitting ported outer sleeve 315 which is mounted for rotation about the inner cylinder 310 as shown in FIG. 8 and is driven by any appropriate means (not shown).

The sleeve 315 has circumferential ports 320 (two being shown in the embodiment of FIG. 4 and three in the embodiment of FIGS. 5, 6 and 7) extending right round its surface, the structural integrity of the sleeve being maintained by thin spaced webs 321 extending across the slots 320 but thinner with flow of molten metal through the slots whereby a continuous solid conductor can be laid down. The sleeve 315 also has transverse ports 325 shown spaced about 60° apart. Clearly the spacing is a matter of choice. Once more the structural integrity of the sleeve 315 is maintained by webs 326 as shown in FIGS. 6 and 7.

The inner cylinder 310 has stub axles 327 and 328 by which it is held stationary. It is solid apart from a vertically disposed slot 330 held in a vertical plane. The body of the cylinder 310 may be provided with heating means e.g. electrical heaters to control the temperature of the metal in the slot 330.

Molten metal is fed to the slot 330 at the desired rate, e.g. by a pump via the stub axle 327 which is hollow for this purpose.

The outer sleeve 315 is provided with bearings 332 and 333 which engage the outer surface of the axles 327 and 328 and can be used as the drive input site for the sleeve 315.

The drive is preferably a variable speed drive and the sleeve 315 is preferably rotated in the same direction and at the same speed as the support 301 is moved through the nip between the device 305 and the roll 306.

The sleeve 315 is preferably provided with cooling means e.g. an air blast directed at its outside upper surface and with internal electrical heaters and temperature sensors so that its temperature can be maintained within desired limits.

A variable flow rate variable temperature fish tail air blast (not shown) is preferably also provided and is directed at the downstream side of the nip between the rolls 305 and 306 on the upper surface of the support 301 so as to achieve any desired degree of cooling.

The support is cooled to ambient temperature and then lead through an active material applying station 340 shown in FIG. 10. This consists of a tank 341 having side walls 342 and 343 extending down past the sides of the support to a suction box 344. The tank has end walls 346 and 347 extending down to just above the level of the solid conductor on the support. Inside the tank there is an inclined baffle 348 extending horizontally across the tank and down to just behind the front wall 346 so as to leave a slot 349 between it and the front wall. Thus slurry poured or pumped onto the baffle 348 will flow down to the slot 349 and then pour as an even curtain down the inside face of the front wall and onto the support and its liquid content will be drawn through the support by the suction box 344, so that when the material issues from beneath the wall 347 the active material will be a wet solid cake on the support.

The surface of the material can be smoothed if desired by passing it under a doctor knife 352.

It may then be sprayed with dilute sulphuric acid and then dried and electrolytically formed.

The rotating vane viscometer torque value as defined herein is the value of the steady state torque value of the sample measured in the manner and on the machine, the specification of British patent application nos. 45241/74 cognate with 55500/74 and 42226/75 at a shear rate of six revolutions of the paddles per minute at ambient temperature of 20° C. minus the background torque value at 20° C.

What we claim as our invention and desire to secure by Letters Patent is:

1. An electrode structure for an electrochemical cell comprising a porous fibrous support made of thermoplastic organic polymeric fiber material selected from the group consisting of polyolefins and polyesters, which is 0.1 to 3 mm. thick, having cast thereon and bonded thereto a pattern of solid conductors extending over the surface of the porous support from a current take off region to regions spaced therefrom, and containing electrochemically active material deposited on the fibrous support, in contact with the conductors, in an amount of at least 0.1 grams/sq. cm/mm thickness in such a manner that electrical energy produced by the electrochemical reaction can be conducted out of the electrode.

2. An electrode structure as claimed in claim 1 in which the thermoplastic organic polymeric material is selected from the group consisting of polyethylene, polypropylene, polyester, heterofil, and polyester bicomponent fibers.

3. An electrode structure as claimed in claim 2 in which the solid conductors are linear.

4. An electrode structure as claimed in claim 3, in which an edge conductor member extends around the whole area of the electrode structure from the current take off region, the edge conductor having a cross sectional area in the range 0.10 to 4.5 sq. mms.

5. An electrode structure as claimed in claim 1, in which the conductors have a continuous solid structure having a cross sectional area of 0.03 sq. mm. to 7 sq. mm.

6. An electrode structure as claimed in claim 4 in which the conductors are arranged in an incomplete lattice extending over 15% to 85% of the whole area of the electrode structure.

7. An electrode structure as claimed in claim 1 which is rectangular in plan and has a current take off region in the form of a lug in one corner; an edge current conductor extending right round the edge of the support which is a thin, dense, but porous sheet of polyester fibres welded in lines about 1 mm wide spaced apart by about 1 mm, the conductors being in the form of a rectilinear grid pattern of wires of smaller cross section than the edge conductor and consisting of horizontal wires spaced 5 to 10 mms apart and vertical wires spaced about 2 to 4 cms apart.

8. An electrode structure as claimed in claim 7 in which the rectilinear conductors extend inwardly from the edge conductors so as to leave a central conductor free region, the vertical wires extending for about 40 to 60% of their possible theoretical length and the horizontal wires extending for about 30 to 50% of their possible theoretical length from edge to edge of the plate.

9. An electrode structure as claimed in claim 1 in the form of a strip of extended length, having a length at least 10 times its width, and having a regular pattern of conductors formed on its surface, the ratio of the plan area of the conductor to the plan area of the electrode structure being in the range 1:5 to 1:15.

10. An electrode structure for an electrochemical cell comprising a fibrous support made of thermoplastic organic polymeric fiber material selected from the group consisting of polyethylene, polypropylene and polyesters, said porous fibrous support having compressed regions A and non-compressed regions B, wherein the thickness of said compressed regions is from 0.5 to 1 mm and the thickness of said non-compressed regions is from 0.3 to 2 mm, having cast thereon and bonded thereto a pattern of solid conductors extending over the surface of said porous support from a current take off region to regions spaced therefrom, and containing electrochemically active material deposited on said fibrous support, in contact with the conductors, in an amount of at least 0.1 grams/sq. cm/mm thickness in such a manner that electrical energy produced by the electrochemical reaction can be conducted out of the electrode.

11. The electrode structure of claim 10, wherein said thermoplastic organic polymeric material is selected from the group consisting of polyethylene, polypropylene, polyester heterofil and polyester bicomponent fibers.

12. The electrode structure of claim 10, wherein the ratio of the width of said non-compressed regions B to the width of said compressed regions A is from 1:1 to 10:1.

13. The electrode structure of claim 12, wherein the ratio of B to A is from 4:1 to 10:1.

* * * * *